(12) United States Patent
Katada

(10) Patent No.: US 8,579,011 B2
(45) Date of Patent: Nov. 12, 2013

(54) SUNSHADE DEVICE

(75) Inventor: Naochika Katada, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/497,334

(22) PCT Filed: Dec. 16, 2010

(86) PCT No.: PCT/JP2010/072699
§ 371 (c)(1),
(2), (4) Date: Mar. 21, 2012

(87) PCT Pub. No.: WO2011/078058
PCT Pub. Date: Jun. 30, 2011

(65) Prior Publication Data
US 2012/0186758 A1    Jul. 26, 2012

(30) Foreign Application Priority Data

Dec. 24, 2009  (JP) ................................. 2009-292104

(51) Int. Cl.
*B60J 1/18*    (2006.01)
(52) U.S. Cl.
USPC ...................................... 160/370.22; 160/70
(58) Field of Classification Search
USPC ......................... 160/370.22, 79, 70; 296/97.8
See application file for complete search history.

(56) References Cited

U.S. PATENT DOCUMENTS

| 5,615,729 | A | * | 4/1997 | Matsumoto et al. | ..... 160/370.22 |
| 5,752,560 | A | * | 5/1998 | Cherng | ............... 160/370.22 |
| 6,135,192 | A | * | 10/2000 | Suzuki et al. | .......... 160/370.22 |
| 6,216,762 | B1 | * | 4/2001 | Lin | ................... 160/370.22 |
| 6,463,983 | B1 | * | 10/2002 | Lang | ......................... 160/23.1 |

(Continued)

FOREIGN PATENT DOCUMENTS

| EP | 0 989 006 | 3/2000 |
| JP | 11-62442 | 3/1999 |

(Continued)

OTHER PUBLICATIONS

International Search Report Issued Mar. 22, 2011 in PCT/JP10/72699 Filed Dec. 16, 2010.

(Continued)

*Primary Examiner* — David Purol
(74) *Attorney, Agent, or Firm* — Oblon, Spivak, McClelland, Maier & Neustadt, L.L.P.

(57) ABSTRACT

A sunshade device including: a windup device; a screen attached to the windup device so as to be drawn therefrom and housed therein; a stay attached to a drawing-side edge of the screen and including a pair of connecting end portions; and a pair of arms configured to change a position between a folded position and an extended position through a rotary movement. The pair of arms each include: a pivot base including a one-end-side portion extending toward a vertical frame side in the extended position and the other-end-side portion extending along the vertical frame; and an arm portion connected the other-end-side portion and extending along the vertical frame, and the pair of connecting end portions are each configured so as to extend and retract in a state of being biased in an extending direction along a drawing/housing direction.

2 Claims, 6 Drawing Sheets

(56) References Cited

U.S. PATENT DOCUMENTS

| | | | |
|---|---|---|---|
| 6,546,307 | B1 | 4/2003 | Hsiao |
| 7,455,345 | B1 * | 11/2008 | Kim .............................. 296/97.4 |
| 7,861,761 | B2 * | 1/2011 | Martineau et al. .............. 160/31 |
| 2009/0277595 | A1 | 11/2009 | Gao et al. |
| 2012/0111512 | A1 | 5/2012 | Katada |

FOREIGN PATENT DOCUMENTS

| | | |
|---|---|---|
| JP | 2001 311375 | 11/2001 |
| JP | 2002 206384 | 7/2002 |
| WO | 2009 137280 | 11/2009 |

OTHER PUBLICATIONS

International Preliminary Report on Patentability issued Aug. 23, 2012 in PCT/JP2010/072699 filed Dec. 16, 2010.
Written Opinion issued Mar. 22, 2011 in PCT/JP2010/072699 filed Dec. 16, 2010 (with English-language translation).
U.S. Appl. No. 13/636,147, filed Sep. 20, 2012, Katada.
Extended European Search Report dated Jul. 5, 2013, issued in European Application No. 10 83 9291.
U.S. Appl. No. 13/822,418, filed Mar. 12, 2013, Katada.
Office Action issued Aug. 13, 2013 in Japanese (counterpart) Application No. 2009-292104 filed Dec. 24, 2009 with partial English-language translation.

* cited by examiner

SUNSHADE DEVICE

TECHNICAL FIELD

The present invention relates to the technology of extending a screen along a window of a vehicle to shield the window.

BACKGROUND ART

Patent Document 1 discloses the technology as a sunshade device. In the motor-driven sunshade device of Patent Document 1, a lower edge of a screen having a shape corresponding to a rear window of a vehicle is fixed to a windup roller, and an upper edge thereof is secured to a horizontal frame, whereby the rear window is shielded by extending the screen upward or downward with vertical frame arms therebetween. The windup roller is constantly biased in the direction in which the screen is wound up by an incorporated coil spring. More specifically, as shown in FIG. 3 of Patent Document 1, the motor-driven sunshade device includes vertical frame arms each including a mounting portion, a pivot portion and an arm portion. The vertical frame arm is configured so as to rotate upward and downward along a plane parallel to the window, with a pivot shaft being provided to a back surface of a proximal end of the mounting portion in a projecting manner to be directly connected to a motor. Further, the vertical frame arm is mounted to the horizontal frame via a sliding member such that an upper end of the arm portion slides left and right. Then, the sliding member slides left and right along the horizontal frame along with the pivot of the vertical frame arms, whereby the screen is extended upward and downward.

PRIOR ART DOCUMENT

Patent Document

Patent Document 1: Japanese Patent Application Laid-Open No. 11-62442 (1999)

SUMMARY OF THE INVENTION

Problem to be Solved by the Invention

Unfortunately, in Patent Document 1, the vertical frame arm is configured such that the mounting portion is directed toward the window frame in the state in which the screen is extended, and thus the arm portion is disposed on the side close to the center in the width direction of the screen with respect to the pivot portion, that is, at the location spaced from the vertical frame of the window. This may make the vertical frame arms conspicuous on the window in the state in which the screen is extended.

In order to prevent the arms (vertical frame arms) from becoming conspicuous, it suffices that the arms are disposed along the vertical frames of the window at the locations in proximity to the vertical frames in the state in which the screen is drawn (extended). For example, the arms may be formed such that in the state in which the screen is drawn, proximal-end-side parts thereof extend along the vertical frames of the window and the distal-end-side parts thereof are disposed along the vertical frames of the window. This shape causes, in the action of extending the arm, an excessive movement in which the stay (horizontal frame) is moved to the extended side further exceeding the extended state and then returns to the location in the extended state.

As a countermeasure against this excessive movement, the mechanism that absorbs the excessive movement of the stay may be provided to the arm. However, it is difficult to make the arms compact per se if the above-mentioned absorbing mechanism is provided to the arms.

Therefore, an object of the present invention is to make arms compact while preventing the arms from becoming conspicuous in the state in which a screen is drawn.

Means to Solve the Problems

A sunshade device according to a first aspect is configured to shield a window, which includes: a windup device; a screen attached to the windup device so as to be drawn therefrom and housed therein; a stay attached to a drawing-side edge of the screen and including a main body and a pair of connecting end portions attached to both end portions of the main body; and a pair of arms each including a distal end portion connected to each of the pair of connecting end portions of the stay so as to rotate relative thereto and a proximal end portion supported by the windup device so as to rotate relative thereto about a rotation shaft, the pair of arms being configured to change a position between a folded position in which the screen is housed and an extended position in which the screen is drawn through the rotary movement about the rotation shaft, wherein: the pair of arms each including: a pivot base including a one-end-side portion extending toward a vertical frame side of the window from the rotation shaft in the extended position and the other-end-side portion extending along the vertical frame of the window in a manner of being bent from a distal end portion of the one-end-side portion; and an arm portion connected to a distal end portion of the other-end-side portion of the pivot base so as to rotate relative thereto and extending along the vertical frame of the window in the extended position; and the pair of connecting end portions of the stay are each configured so as to extend and retract in a state of being biased in an extending direction along a drawing/housing direction of the screen.

According to a second aspect, in the sunshade device of the first aspect, the connecting end portion includes: a fixed portion fixed to each end portion of the main body; and an advancing/retracting portion to which the arm portion is connected so as to rotate relative thereto, the advancing/retracting portion being configured to move relatively close to or apart from the fixed portion along the drawing/housing direction of the screen; and the fixed portion and the advancing/retracting portion are biased in a direction of becoming apart from each other by a biasing member.

According to a third aspect, in the sunshade device of the first or second aspect, the pair of arms include plate-like members.

Effects of the Invention

According to the sunshade device of the first aspect, the pair of arms are configured such that in the extended position, the one-end-side portion of the pivot base extends toward the vertical frame of the window from the rotation shaft and the other-end-side portion and the arm portion extend along the vertical frame of the window. Accordingly, the other-end-side portion and the arm portion of the pair of arms are disposed along the vertical frame, at the locations in proximity to the vertical frames of the window in the extended position. Further, the connecting end portions of the stay are configured so as to extend and retract, and accordingly are capable of absorbing an excessive movement of the stay when the screen is drawn due to the bent shape of the pivot bases of the pair of arms, which avoids the provision of the configuration for absorbing an excessive movement in the arm itself. This makes the arms compact while making the arms inconspicuous in the state in which the screen is drawn.

According to the sunshade device of the second aspect, the connecting end portion is configured so as to extend and retract when the advancing/retracting portion connected to the arm portion moves relative to the fixed portion separately provided, which enables to change the position of the pair of arms more stably.

According to the sunshade device of the third aspect, the pair of arms are formed of plate-like members, whereby the area of the window occupied by the screen in the direction approximately perpendicular to the window can be made smaller in the state in which the screen is drawn. This relatively reduces the opening of the arm housing portion in a case where, for example, the pair of arms are used in a manner of being housed in the window frame. This also makes the sunshade device compact in its entirety in the state in which the screen is housed. As a result, the efficiency of transporting the sunshade device to the body assembly step can be enhanced.

EMBODIMENT FOR CARRYING OUT THE INVENTION

A sunshade device according to an embodiment is described. This sunshade device is a device for shielding a window with a screen.

<1. As to Application Target>

Figure 1:
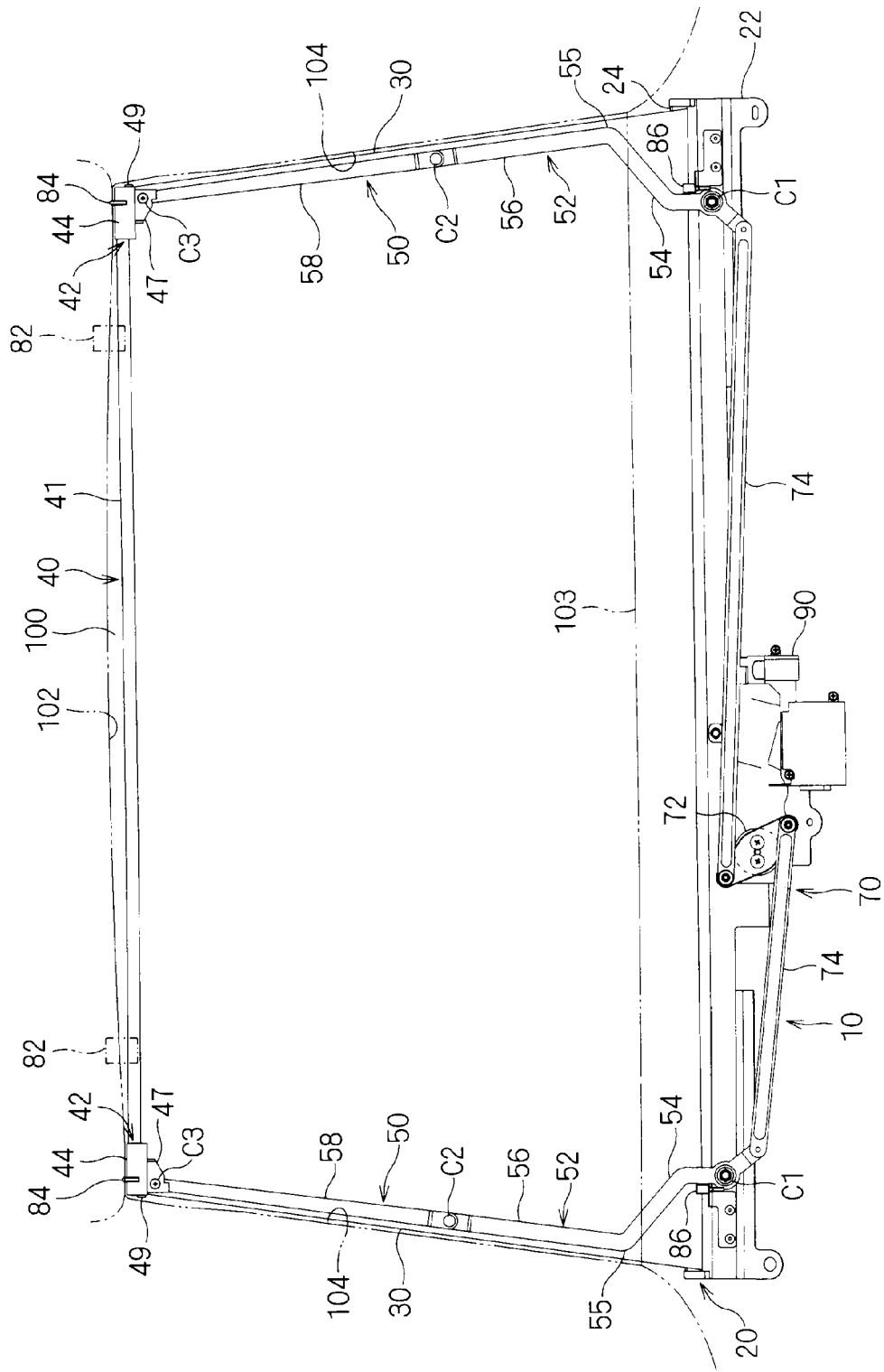
FIG. 1 is a plan view showing a sunshade device in a state in which a screen is drawn.
Figure 2:
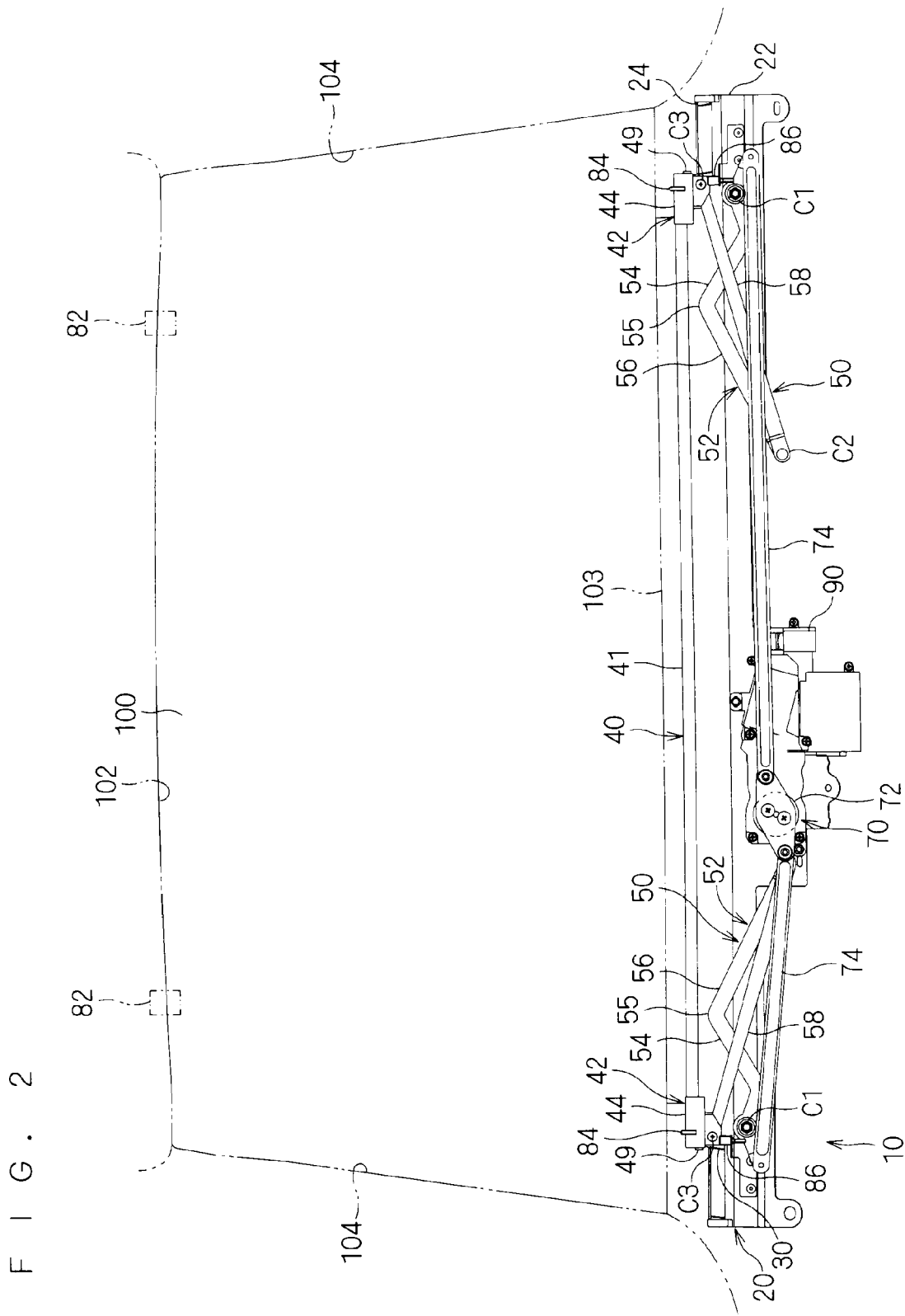
FIG. 2 is a plan view showing the sunshade device in a state in which the screen is housed.

For the sake of description, a window 100 being a target to which a sunshade device 10 is applied is described (see FIG. 1 and FIG. 2).

The targets to which the sunshade device 10 is applied are various windows 100 of a vehicle. Description is now given assuming that the window 100 is a rear window of a car and is formed in an approximately trapezoidal shape. Four sides of the window 100 are surrounded by a ceiling-side horizontal frame 102 and a floor-side horizontal frame 103 that extend along the width direction of the car and a pair of vertical frames 104 adjacent to the ceiling-side horizontal frame 102 and the floor-side horizontal frame 103. Here, the ceiling-side horizontal frame 102, the floor-side horizontal frame 103, and the vertical frames 104 refer to the parts disposed at the edges of the window 100 as well as surrounding parts including interior resin panels (such as roof, rear tray and trim) of the vehicle.

Needless to say, application of the sunshade 10 is not limited to a rear window of a car, which may be applied to a window provided on the side of the car body.

<2. Configuration of Sunshade Device>

The configuration of the sunshade device 10 is described (see FIG. 1 and FIG. 2).

The sunshade device 10 includes a windup device 20, a screen 30, a stay 40 and a pair of arms 50. Schematically, the sunshade device 10 is configured so as to draw/house the screen 30 attached to the windup device 20 by means of the stay 40, upon positional change of the pair of arms 50.

The windup device 20 includes a base 22 and a windup shaft 24, which is configured such that the windup shaft 24 is supported by the base 22 so as to rotate relative thereto about an axis and is rotatively biased against one side in the rotation direction about the axis by a biasing member (not shown) (coil spring). It suffices that the base 22 is formed so as to be mounted to the vehicle by, for example, screwing.

The screen 30 is a sheet-like member formed by, for example, cutting and sewing the material such as mesh cloth or a resin sheet in accordance with the shape and size of a target window 100. The screen 30 may be formed with a fabric material capable of shading the light entering through a car window. In this case, the screen 30 is formed in an approximately trapezoidal shape correspondingly to the window 100 (see FIG. 1). Needless to say, the shape of the screen 30 is not limited thereto and, for example, may be rectangular.

The screen 30 is attached to the windup device 20 so as to be drawn therefrom and housed therein. More specifically, one edge (here, a long-side part having an approximately trapezoidal shape) of the screen 30 is attached to the windup shaft 24 of the windup device 20 along the longitudinal direction thereof. This attachment state is set such that the screen 30 keeps the state of being drawn (wound and biased state) in the housing direction between the housed state (see FIG. 2) and the drawn state (see FIG. 1). That is, the screen 30 is kept in the state of being housed in the windup device 20 in the state in which no external force is exerted thereon.

The windup device 20 to which the screen 30 is attached is disposed in the floor-side horizontal frame 103 of the window 100 in a position in which the screen 30 can be drawn from the floor-side horizontal frame 103 to the ceiling-side horizontal frame 102 along the window 100. The floor-side horizontal frame 103 is open toward the ceiling-side horizontal frame 102 and is configured such that the screen 30 is drawn therefrom and housed therein through this opening. In this case, the floor-side horizontal frame 103 is configured so as to house the entire sunshade device 10 in the state in which the screen 30 is housed.

The stay 40 is attached to the drawing-side edge (here, a short-side part having an approximately trapezoidal shape) of the screen 30. More specifically, the stay 40 is formed into an elongated rod shape as a whole, and is attached so as to extend along the drawing-side edge of the screen 30. This stay 40 is moved close to or apart from the windup device 20 in the drawing/housing direction of the screen 30, whereby the screen 30 is drawn/housed.

Figure 3:
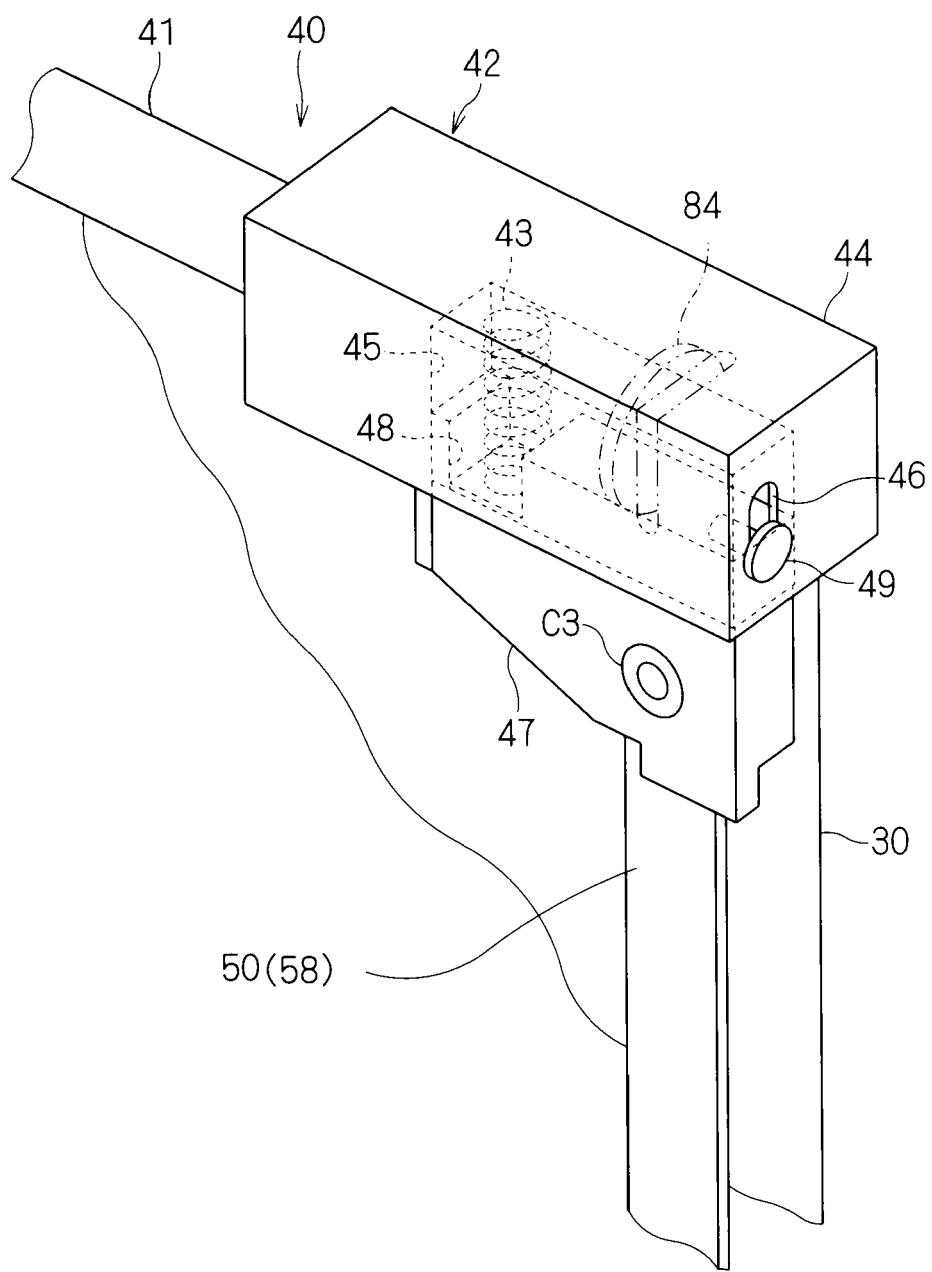
FIG. 3 is a perspective view showing a connecting end portion of a stay.

The stay 40 includes a main body 41 and a pair of connecting end portions 42. More specifically, the stay 40 is configured such that the connecting end portions 42 are respectively mounted to both end portions of the main body 41 formed into an elongated rod shape. The pair of arms 50 descried below are respectively connected to the pair of connecting end portions 42. The connecting end portion 42 is configured so as to extend and retract along the drawing/housing direction of the screen 30. More specifically, the connecting end portion 42 includes a fixed portion 44 fixed to each end portion of the main body 41, and an advancing/retracting portion 47 to which the arm 50 is rotatably connected relative thereto and which is capable of moving close to or apart from the fixed portion 44 relative thereto along the drawing/housing direction of the screen 30 (see FIG. 3).

The fixed portion 44 is a member formed approximately into a rectangular solid with one side surface thereof being fixed to each end portion of the main body 41. The fixed portion 44 has a housing recess 45 that is open on one main surface thereof (one surface approximately parallel to the longitudinal direction of the main body 41). The opening direction of the housing recess 45 is approximately identical to the housing direction of the screen 30 to which the stay 40 is attached. The housing recess 45 is formed so as to house a distal-end-side part of the advancing/retracting portion 47 and move the advancing/retracting portion 47 along the depth direction (approximately identical to the drawing/housing direction of the screen 30) in this housing state. The housing recess 45 is formed to have a cross-sectional shape larger (in this case, slightly larger) than the cross-sectional shape of the advancing/retracting portion 47. Then, the housing recess 45 is capable of guiding the advancing/retracting portion 47 to move in the depth direction upon contact of the advancing/retracting portion 47 with an inner wall surface.

A guiding portion 46 capable of guiding a guide portion 49 of the advancing/retracting portion 47, which is described below, is formed in the fixed portion 44. This guiding portion 46 is open on the surface (in this case, surface opposed to the surface to which the main body 41 is attached) adjacent to the one main surface of the fixed portion 44 and passes through the housing recess 45, which is formed into an elongated slot shape along the depth direction of the housing recess 45. The guiding portion 46 guides the guide portion 49 within the range of the longitudinal direction of the slot. That is, the guiding portion 46 is configured so as to regulate the movement of the advancing/retracting portion 47 within the range in which the guide portion 49 can move. The guiding portion 46 guides, relative to the fixed portion 44, the advancing/retracting portion 47 that moves along the wall surface of the housing recess 45 in an auxiliary manner.

The advancing/retracting portion 47 is formed such that the arm 50 described below can be connected to the proximal-end-side part thereof. More specifically, the advancing/retracting portion 47 is formed such that the arm 50 can be connected to rotate relative thereto about an axis along the direction approximately perpendicular to the screen 30 attached to the stay 40. In this case, the advancing/retracting portion 47 and the arm 50 are connected to rotate relative thereto with, for example, a pin as described below.

The advancing/retracting portion 47 includes the guide portion 49 guided (a movement thereof is regulated) by the guiding portion 46 of the fixed portion 44. More specifically, the guide portion 49 is formed in a manner of protruding toward the inside of the guiding portion 46 along the passing-through direction of the guiding portion 46 in a state in which the distal-end-side part of the advancing/retracting portion 47 is housed in the housing recess 45 of the fixed portion 44. Here, the guide portion 49 is a screw mounted to the distal-end-side part of the advancing/retracting portion 47 housed in the housing recess 45 from the outside of the fixed portion 44, through the opening of the guiding portion 46. In the relationship between the guiding portion 46 and the guide portion 49, the width dimension (here, diameter) of the part of the guide portion 49, which is disposed in the guiding portion 46, is formed to be slightly larger than the width dimension of the guiding portion 46. The advancing/retracting portion 47 is configured so as to move relative to the fixed portion 44 within the range in which the guide portion 49 is guided by the guiding portion 46.

The fixed portion 44 and the advancing/retracting portion 47 are biased against each other in a separation direction by a biasing member 43 such that the connecting end portion 42 is extended in its entirety. More specifically, the biasing member 43 is disposed to exert a biasing force along the depth direction (moving direction of the advancing/retracting portion 47) of the housing recess 45. Here, the biasing member 43 is a coil spring and is disposed in a manner of being compressed in the housing recess 45 along the depth direction thereof. Needless to say, the biasing member 43 is not limited to a coil spring, which may use a leaf spring, other elastic member or the like. Further, the biasing member 43 is disposed between the fixed portion 44 and the advancing/retracting portion 47 in such a manner that one end portion thereof is disposed in a spring-mounted portion 48 formed in the distal-end-side part of the advancing/retracting portion 47. The spring-mounted portion 48 is formed in a recessed shape that is open toward the bottom of the housing recess 45, at the distal-end-side part of the advancing/retracting portion 47.

Figure 5:
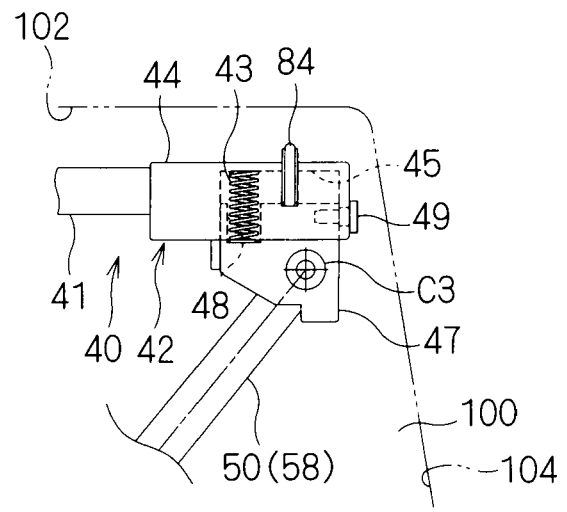
FIG. 5 is a view showing the connecting end portion of the stay in a position A of FIG. 4.

In the state in which an external force is not exerted in the direction in which the fixed portion 44 and the advancing/retracting portion 47 become close to each other, the connecting end portion 42 is kept in the extended state in which the fixed portion 44 and the advancing/retracting portion 47 are spaced from each other by the biasing force of the biasing member 43 (see FIG. 5). When an external force equal to or larger than the biasing force of the biasing member 43 is exerted in the direction in which the fixed portion 44 and the advancing/retracting portion 47 become close to each other, the biasing member 43 is compressed further and enters the compressed state in which the fixed portion 44 and the advancing/retracting portion 47 are close to each other (see FIG. 7). Note that the guide portion 49 is disposed at the location at which it abuts against the proximal end portion of the guiding portion 46 in the extended state and is disposed at the location at which it is moved on the side close to the distal end with respect to the proximal end portion of the guiding portion 46.

A guiding body 84, which comes into contact with one main surface of the window 100 and guides the stay 40 to move along the one main surface when the screen 30 is drawn, may be provided in the connecting end portion 42. For example, as the guiding body 84, a disk member may be disposed at the distal end portion of the connecting end portion 42 so as to rotate about the axis along the longitudinal direction of the stay 40 (see FIG. 3). In a case of providing the guiding body 84 as described above, though omitted in FIG. 3, a slit is formed at the distal end portion of the advancing/retracting portion 47 housed in the housing recess 45 correspondingly to the location of the guiding body 84 for avoiding interference with the guiding body 84.

The sunshade device 10 is configured such that the screen 30 is drawn or housed when the stay 40 moves close to or apart from the windup device 20 in accordance with the action of the pair of arms 50 that are mounted between the stay 40 and the windup device 20 (see FIG. 1 and FIG. 2).

Distal end portions of the pair of arms 50 are connected to the connecting end portions 42 of the stay 40 so as to rotate relative thereto and the proximal ends thereof are supported by the windup device 20 so as to rotate about the rotation shaft (rotation shaft of a first connecting portion C1 described below) relative thereto. The pair of arms 50 are configured so as to change a position between the folded position in which the screen 30 is housed and the extended position in which the screen 30 is drawn through the rotary movement about the rotation shaft. Each of the pair of arms 50 includes a pivot base 52 and an arm portion 58.

The pivot base 52 is formed in an approximately L-shape having a bent portion 55 (in this case, a bent shape at an obtuse angle), and a part of one-end-side portion 54 located on the side close to the proximal end with respect to the bent portion 55 is connected to the base 22 (in this case, spot on the end portion side in the longitudinal direction) of the windup device 20 by a pin or the like so as to rotate relative thereto about the rotation shaft that is approximately perpendicular to the screen 30 in the drawn state, and is supported thereby. Description is given below by referring to the connected portion as the first connecting portion C1. In this case, the pivot base 52 is supported by the base 22 to move on an imaginary plane with spacing from the screen 30 in the direction approximately perpendicular to the screen 30 in a drawn state so as not to interfere with the screen 30 that is drawn from the windup device 20. Further, a distal end portion of the other-end-side portion 56 positioned on the side close to the distal end with respect to the bent portion 55 of the pivot base 52 is formed so as to be connected to a proximal end portion of the arm portion 58.

More specifically, the pivot base 52 is supported by the windup device 20 in a position such that in the state in which the arms 50 are extended, the one-end-side portion 54 on the side close to the proximal end with respect to the bent portion 55 extends toward the vertical frame 104 of the window 100 from the first connecting portion C1 and the other-end-side portion 56 on the side close to the distal end with respect to the bent portion 55 extends along the vertical frame 104 (see FIG. 1). In this case, the other-end-side portion 56 of the pivot base 52 is configured so as to be disposed along the vertical frame 104 at the location in proximity to the vertical frame 40.

The arm portion 58 is formed in an elongated rod shape, and a distal end portion thereof is connected to the advancing/retracting portion 47 of the connecting end portion 42 of the stay 40 so as to rotate relative thereto and a proximal end portion thereof is connected to a distal end portion of the pivot base 52 so as to rotate relative thereto. More specifically, the arm portion 58 is connected to the advancing/retracting portion 47 and the pivot base 52 by a pin or the like so as to rotate relative thereto about the axis approximately perpendicular to the screen 30 in the drawn state. Hereinafter, the connecting portion between the arm portion 58 and the pivot base 52 is referred to as a second connecting portion C2 and the connecting portion between the arm portion 58 and the connecting end portion 42 is referred to as a third connecting portion C3.

In the state in which the arms 50 are extended, the arm portion 58 is configured so as to be disposed almost linearly with respect to the other-end-side portion 56 of the pivot base 52 and extend along the vertical frame 104. The arm portion 58 is configured so as to be, in the state in which the arms 50 are extended, disposed along the vertical frame 104 at the location in proximity to the vertical frame 104 together with the other-end-side portion 56 of the pivot base 52.

Here, the pair of arms 50 are formed of a plate-like member. More specifically, the arm 50 is configured such that the plate-like pivot base 52 and the plate-like arm portion 58 are connected to each other in a manner of being overlaid in the thickness direction thereof (second connecting portion C2). That is, the pair of arms 50 are connected to the windup device 20 and the stay 40 and the positions thereof are changed in a position in which the thickness direction thereof is approximately perpendicular to the screen 30 in the drawn state.

The pair of arms 50 may be provided with stoppers (not shown) for preventing the position thereof from changing in the extending direction beyond the extended position. For example, the stopper may employ such a configuration that the pair of arms 50 abut against the lateral end of the pivot base 52 or the arm portion 58 at the location at which the position thereof is changed to the extended position to regulate the position change of the pair of arms 50 in the direction in which the pair of arms 50 are extended.

In the pair of arms 50 in the folded state, the pivot base 52 and the arm portion 58 are folded at the location of the second connecting portion C2 such that the second connecting portion C2 is directed toward the center in the longitudinal direction of the windup device 20 and the stay 40 (width direction of the vehicle and window 100) (see FIG. 2). In this case, the pair of arms 50, the stay 40 and the screen 30 are disposed in the floor-side horizontal frame 103 together with the windup device 20 in the state in which the pair of arms 50 are folded. Further, in the arms 50 in the extended state, the one-end-side portions 54 of the pivot bases 52 are partially exposed through the opening of the floor-side horizontal frame 103 and the other-end-side portions 56 and the arm portions 58 are disposed along the vertical frame 104 in an approximately linear position at the locations in proximity to the vertical frames 104.

A pair of arms 50 may be configured such that the other-end-side portion 56 of the pivot base 52 and the arm portion 58 are housed in the vertical frame 104, depending on a car type. More specifically, there is conceivable a configuration in the vicinity of a car window in which a recess capable of housing the other-end-side portion 56 of the pivot base 52 and the arm portion 58 (part of the connecting end portion 42) therein is formed in the vertical frame 104. In this case, a pair of arms 50 may be configured such that in the extended position, the other-end-side portion 56 of the pivot base 52 and the arm portion 58 are housed in the recess in the position of extending along the vertical frame 104.

When the position of the pair of arms 50 having the above-mentioned configuration is changed, due to the bent shape of the pivot base 52, the stay 40 enters the state of being moved to the location on the side on which the screen 30 is drawn beyond the location in the extended position while the position of the pair of arms 50 is being changed. More specifically, the pair of arms 50 enter the state in which the screen 30 is drawn most in the position in which the second connecting portion C2 is disposed on a straight line that connects the first connecting portion C1 and the third connecting portion C3, and the stay 40 is moved in the housing direction when the position is changed from this position to the extended position.

In order to prevent the stay 40 from moving excessively as described above, regulating members 82 capable of regulating the movement of the stay 40 in the direction in which the screen 30 is drawn/housed may be disposed in the ceiling-side horizontal frame 102 or the like. It suffices that the regulating member 82 is disposed so as to abut against the drawing-side end portion of the stay 40 at least in the state in which the pair of arms 50 are extended and to regulate a movement in a manner that the stay 40 is prevented from moving in the drawing direction of the screen 30 from the abutting location.

Then, the stay 40 abuts against the regulating members 82 at the location in the course of position change from the folded position to the extended position of the pair of arms 50, and the position thereof is changed further, whereby the connecting end portions 42 are retracted. Accordingly, the stay 40 is kept at the location at which it abuts against the regulating members 82 while the position of the pair of arms 50 is being changed to the extended position. This prevents the stay 40 from coming into contact with, for example, the ceiling-side horizontal frame 102 due to an excessive movement thereof, which prevents the ceiling-side horizontal frame 102 from being damaged.

Further, the stay 40 is configured so as to keep the state of being pressed against the regulating members 82 by the biasing force of the biasing members 43 also in the state in which the pair of arms 50 are extended. This suppresses the screen 30, the stay 40 and the pair of arms 50 from rattling in the position in which the pair of arms 50 are extended.

Needless to say, the regulating member 82 may be mounted to the stay 40 itself, which is only required to be configured so as to abut against the ceiling-side horizontal frame 102 at the above-mentioned location.

Further, the sunshade device 10 may be provided with support members 86 that suppress the stay 40 from rattling in the position in which the pair of arms 50 are folded. For example, as the support member 86, a member capable of elastically abutting against the proximal end portion of the advancing/retracting portion 47 of the connecting end portion 42 in the position in which the pair of arms 50 are folded or a recessed member or the like that is capable of supporting the advancing/retracting portion 47 may be disposed in the base 22 of the windup device 20.

Further, the sunshade device 10 is configured such that the pair of arms 50 are driven by a drive mechanism portion 70 and accordingly the screen 30 is drawn and housed automatically (see FIG. 1 and FIG. 2).

The drive mechanism portion 70 is configured so as to rotatively drive the pivot base 52 about the rotation shaft of the first connecting portion C1. In this case, the drive mechanism portion 70 includes a motor 72 and given links 74 connected to the motor 72 and the parts of the pivot bases 52 on the side close to the proximal end with respect to the first connecting portion C1, and is configured so as to rotatively drive the pivot bases 52 via the given links 74 by the motor 72. It suffices that the drive mechanism portion 70 is connected to an operating portion (not shown) capable of operating driving of the motor 72 so as to operate drawing/housing of the screen 30 via the operating portion.

Further, the drive mechanism portion 70 may be configured such that rotary driving of the motor 72 is stopped when the position of the pair of arms 50 is changed between the folded position and the extended position. Examples of the configuration that can be employed as the above-mentioned configuration include the configuration in which microswitches 90 (FIGS. 1 and 2 show only the microswitch 90 that can be pressed in the folded position) are disposed at the locations pressed by the pair of arms 50 or the stay 40 and the motor 72 is stopped through a pressing operation thereof when the position of the pair of arms 50 is changed between the folded position and the extended position, and the configuration in which, for example, a rotary encoder is disposed and the motor 72 rotates for a predetermined amount of rotation and then stops.

Further, the sunshade device 10 is applicable to, for example, a sunroof, a side door window and the like in addition to a rear window of a car and windows other than ones of a car.

<3. Action of Sunshade Device>

Figure 4:
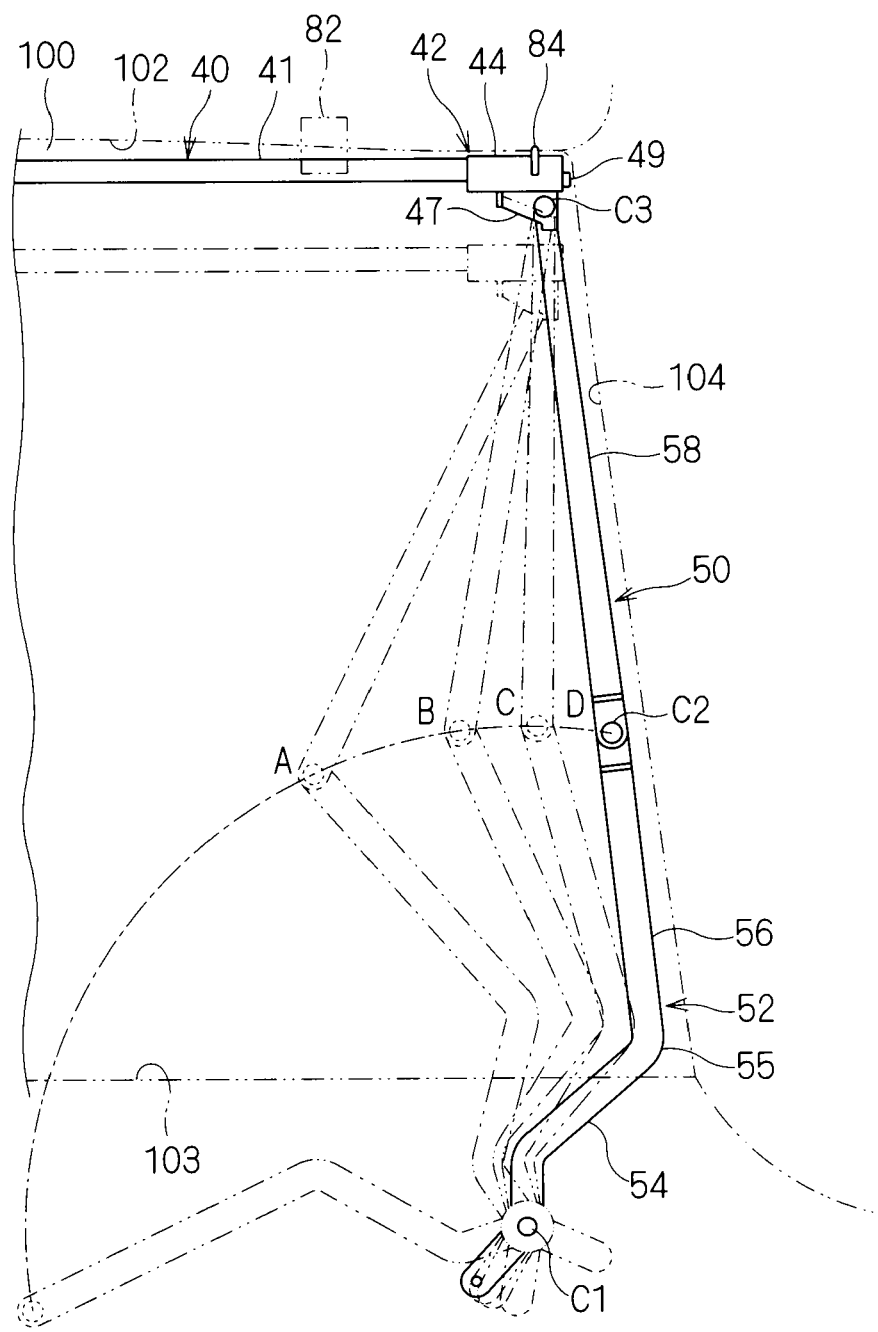
FIG. 4 is a view showing an action of changing a position of an arm.

Next, the action of the sunshade device 10 according to the present embodiment is described (see FIG. 4).

First, the action of drawing the screen 30 is described. Description is given assuming that as an initial state of the sunshade device 10, the screen 30 is maintained by the windup device 20 to be housed therein in the state in which a pair of arms 50 are folded (see FIG. 2). In this state, the fixed portion 44 and the advancing/retracting portion 47 are spaced from each other by the biasing member 43, whereby the connecting end portion 42 is maintained in the extended state.

An operator (such as a driver or occupant of a car) operates an operating portion (not shown) to draw the screen 30, and then a pair of arms 50 start changing a position from the folded position to the extended position. More specifically, upon the operating portion being operated, the motor 72 is rotatively driven, whereby the pivot base 52 is rotatively driven about the rotation shaft of the first connecting portion C1 via the given link 74 (in this case, in such a manner that the other-end-side portion 56 of each pivot base 52 is opened toward the drawing side of the screen 30) (see FIG. 3). The position of the arm portion 58 is changed in accordance with the rotary movement of the pivot base 52, and the stay 40 connected to the arm portion 58 moves toward the drawing direction of the screen 30. That is, the distal end portion of the arm portion 58 is connected to the connecting end portion 42 and the movement thereof is regulated in the longitudinal direction of the stay 40, and the proximal end portion thereof is moved along the vertical frame 104 by the pivot base 52, whereby the position of the arm portion 58 is changed. Then, as the rotary movement of the pivot base 52 advances, the position of the pair of arms 50 is changed such that the second connecting portions C2 gradually become close to the vertical frames 104 (second connecting portions C2 are spaced from each other) and the angle formed by the longitudinal direction of the arm portion 58 and the edge of the vertical frame 104 approaches 0 degrees.

Note that the connecting end portion 42 is maintained in the extended state until it reaches the location at which the stay 40 abuts against the regulating members 82 (see position A of FIG. 4 and FIG. 5).

In the course of the action of drawing the screen 30, the guiding bodies 84 provided to the connecting end portions 42 of the stay 40 come into contact with one main surface of the window 100, and the stay 40 is moved in the drawing direction along the window 100 in this contact state.

Figure 6:
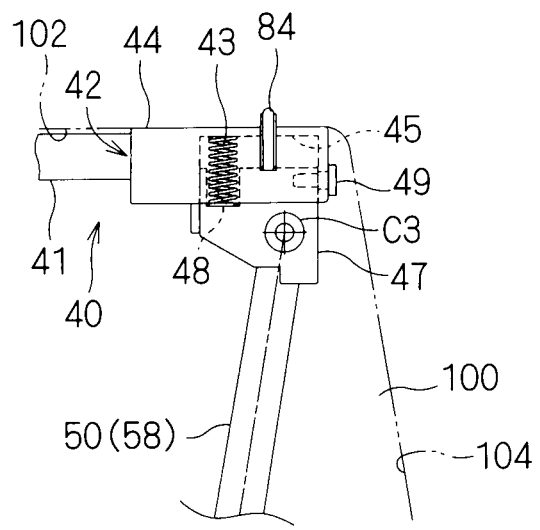
FIG. 6 is a view showing the connecting end portion of the stay in a position B of FIG. 4.

When the pair of arms 50 are extended to the location at which the stay 40 abuts against the regulating members 82 (see position B of FIG. 4 and FIG. 6), the movement of the stay 40 in the direction in which the screen 30 is drawn is regulated, and the connecting end portions 42 of the stay 40 are gradually compressed in accordance with the extending action of the pair of arms 50. More specifically, a compression force is gradually applied in the drawing direction of the screen 30 along with a position change of the pair of arms 50 from the position in which the stay 40 abuts against the regulating members 82, and the advancing/retracting portion 47 is moved close to the fixed portion 44, whereby the biasing member 43 is compressed. In other words, the connecting end portion 42 acts to enter the compressed state from the extended state.

Figure 7:
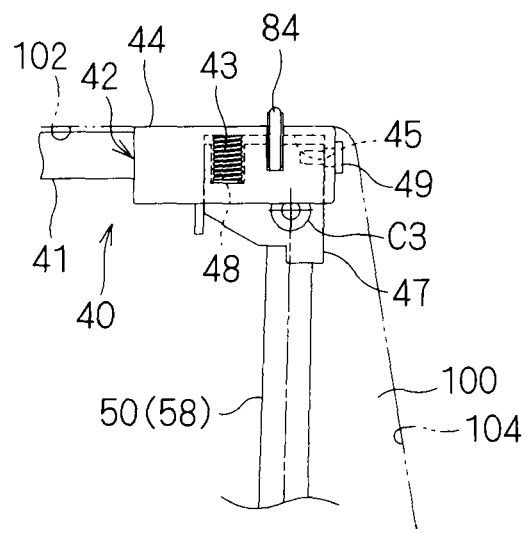
FIG. 7 is a view showing the connecting end portion of the stay in a position C of FIG. 4.
Figure 8:
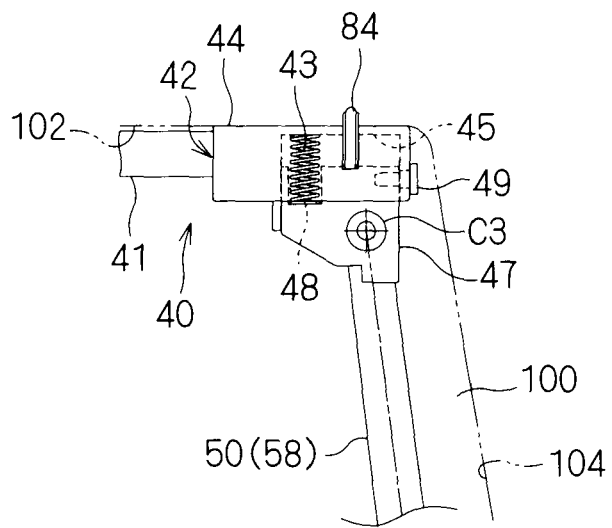
FIG. 8 is a view showing the connecting end portion of the stay in a position D of FIG. 4.

Then, in the connecting end portion 42, the distal-end-side part of the advancing/retracting portion 47 is pushed into the housing recess 45 of the fixed portion 44 most in the position in which the second connecting portion C2 is disposed on a straight line that connects the first connecting portion C1 and the third connecting portion C3 (position C of FIG. 4) (see FIG. 7). The pivot base 52 is rotatively driven further, whereby the advancing/retracting portion 47 is moved along the direction in which the screen 30 is housed, and the connecting end portion 42 is moved by the biasing force of the biasing member 43 such that the advancing/retracting portion 47 is spaced from the fixed portion 44. That is, the connecting end portion 42 acts to return to the extended state from the compressed state. Further, along with the position change of the pair of arms 50, the positions of the other-end-side portion 56 of the pivot base 52 and the arm portion 58 are gradually changed to the positions at which they extend along the vertical frame 104, at the locations in proximity to the vertical frame 104 (see position D of FIG. 4 and FIG. 8).

Then, when the position of the pair of arms 50 is changed to the extended position, the motor 72 stops, and the screen 30 is drawn, whereby the action of drawing the screen 30 is finished. In the state in which the screen 30 is drawn, the arm portion 58 and the other-end-side portion 56 of the pivot base 52 are disposed at the locations at which they are in an approximately linear position and extend along the vertical frame 104 at the location in proximity to the vertical frame 104. In this state, most of the one-end-side portion 54 of the pivot base 52 is disposed in the floor-side horizontal frame 103. Further, in the state in which the pair of arms 50 are extended, the stay 40 is kept in the state of being pressed against the regulating members 82 by the biasing force of the biasing members 43. Then, the screen 30 enters the state in which the window 100 is partially or entirely shielded.

Next, the action of housing the screen 30 is described. The operator operates the operating portion to house the screen 30, and then the pair of arms 50 start changing a position from the extended position to the folded position. More specifically, when the operating portion is operated, the motor 72 is rotatively driven in the direction opposite to that when the screen 30 is drawn, and the pivot base 52 is rotatively driven such that the other-end-side portion 56 is folded toward the center in the longitudinal direction of the windup device 20. As a result of the rotary movement of the pivot base 52, the pivot base 52 and the arm portion 58 are folded at the second connecting portion C2, and then the position of the pair of arms 50 is changed such that the second connecting portion C2 is gradually spaced from the vertical frame 104.

The connecting end portion 42 is gradually compressed from the extended state (see position D of FIG. 4 and FIG. 8) until the position of the pair of arms 50 is changed to the position in which the second connecting portion C2 is disposed on a straight line that connects the first connecting portion C1 and the third connecting portion C3, to thereby enter the compressed state (see FIG. 7). When the position of the pair of arms 50 is further changed to the folded position from the position in which the connecting portions C1, C2 and C3 are positioned on a straight line (position D of FIG. 4), the connecting end portion 42 is gradually extended by the biasing force of the biasing member 43, to thereby enter the extended state (see position B of FIG. 4 and FIG. 6). Then, the connecting end portion 42 is kept in the extended state after the stay 40 is spaced from the regulating member 82 (see position A of FIG. 4 and FIG. 5).

Then, when the position of the pair of arms 50 is changed to the folded position, the motor 72 is stopped, and the screen 30 is housed, whereby the action of housing the screen 30 is finished. In the state in which the screen 30 is housed, the screen 30, the stay 40 and the pair of arms 50 are disposed in the floor-side horizontal frame 103 (see FIG. 2). In this state, the connecting end portion 42 of the stay 40 enters the state in which the proximal end portion of the advancing/retracting portion 47 abuts against the support member 86.

As described above, the operation of drawing/housing the screen 30 can be performed. Note that it is possible to partially shield the window 100 in the vertical direction of the window 100 by stopping driving of the motor 72 at the location in the course of drawing or housing the screen 30.

According to the sunshade device 10 configured as described above, the pair of arms 50 are configured such that, in the extended position, the one-end-side portion 54 of the pivot base 52 extends toward the vertical frame 104 of the window 100 from the first connecting portion C1 and the other-end-side portion 56 of the pivot base 52 and the arm portion 58 extend along the vertical frame 104 of the window 100 in such a manner of being bent from the distal end portion of the one-end-side portion 54 of the pivot base 52. With this configuration, in the pair of arms 50 in the extended position, the other-end-side portion 56 of the pivot base 52 and the arm portion 58 are disposed at the locations in proximity to the vertical frame 104 of the window 100 along the vertical frame 104. Further, the configuration in which the connecting end portion 42 of the stay 40 can extend and retract enables to absorb an excessive movement of the stay 40 due to the folded shape of the pair of arms 50 when the screen 30 is drawn, which avoids the provision of the configuration for absorbing an excessive movement to the arms 50 per se. This makes the arms 50 compact while preventing the arms 50 from becoming conspicuous in the state in which the screen 30 is drawn.

This saves the space of movement for the distance amount of excessive movement of the stay 40 in the vertical direction of the window 100, whereby the window 100 can be covered over the entire longitudinal direction.

Further, the connecting end portion 42 is configured so as to extend and retract as a result of the advancing/retracting portion 47 to be connected to the arm 50 moving relative to the fixed portion 44 separately provided, whereby it is possible to change the position of the pair of arms 50 more stably.

Further, the pair of arms 50 are formed of plate-like members, and accordingly, the area of the window 100 occupied by the screen 30 in a direction approximately perpendicular thereto can be reduced in the state in which the screen 30 is drawn. This relatively reduces the opening of the floor-side horizontal frame 103 through which the pair of arms 50 in the folded position, stay 40 and screen 30 disposed in the floor-side horizontal frame 103 pass when the screen 30 is drawn, which suppresses a reduction of the strength of the floor-side horizontal frame 103. A similar effect can be expected for the vertical frame 104 also in a case where the other-end-side portion 56 of the pivot base 52 and the arm portion 58 are housed in the vertical frame 104 when the pair of arms 50 are extended. When the screen 30 is housed, the sunshade device 10 can be made compact in its entirety. This enhances the efficiency of transporting the sunshade device 10 to the body assembly step.

While the sunshade device 10 has been described above in detail, the foregoing description is in all aspects illustrative, and the present invention is not limited thereto. That is, numerous modifications and variations can be devised in the described aspects without departing from the scope of the invention.

DESCRIPTION OF REFERENCE NUMERALS 10 sunshade device
20 windup device
30 screen
40 stay
42 connecting end portion
43 biasing member
50 arm
52 pivot base
54 one-end-side portion
56 the other-end-side portion
58 arm portion
68 biasing member
100 window

The invention claimed is:

1. A sunshade device configured to shield a window, comprising:
   a windup device;
   a screen attached to said windup device so as to be drawn therefrom and housed therein;
   a stay attached to a drawing-side edge of said screen and including a main body and a pair of connecting end portions attached to both end portions of said main body; and
   a pair of arms each including a distal end portion connected to each of said pair of connecting end portions of said stay so as to rotate relative thereto and a proximal end portion supported by said windup device so as to rotate relative thereto about a rotation shaft, said pair of arms being configured to change a position between a folded position in which said screen is housed and an extended position in which said screen is drawn through the rotary movement about said rotation shaft, wherein:
   said pair of arms each including:
      a pivot base including a one-end-side portion extending toward a vertical frame side of said window from said rotation shaft in said extended position and the other-end-side portion being bent from a distal end portion of said one-end-side portion and extending along the vertical frame of said window; and
      an arm portion connected to a distal end portion of said other-end-side portion of said pivot base so as to rotate relative thereto and extending along the vertical frame of said window in said extended position; and
   said pair of connecting end portions of said stay are each configured so as to extend and retract along a drawing-housing direction of said screen and biased in an extending direction along the drawing-housing direction of said screen, and
   wherein said connecting end portion includes:
      a fixed portion fixed to each end portion of said main body; and
      an advancing-retracting portion to which said arm portion is connected so as to rotate relative thereto, said advancing-retracting portion being configured to move relatively close to or apart from said fixed portion along the drawing-housing direction of said screen; and
   said fixed portion and said advancing-retracting portion are biased in such a direction as to become apart from each other by a biasing member.

2. The sunshade device according to claim 1, wherein said pair of arms include plate-like members.

* * * * *